United States Patent
Song et al.

(10) Patent No.: US 10,428,280 B2
(45) Date of Patent: Oct. 1, 2019

(54) METHOD FOR MANUFACTURING OF MULTI-LEVEL PORE ZEOLITE AND UTILIZATION AS CATALYST FOR HYDROISOMERIZATION OF NORMAL PARAFFINS OF MULTI-LEVEL PORE ZEOLITE PREPARED THEREBY

(71) Applicants: S-OIL CORPORATION, Seoul (KR); KOREA ADVANCED INSTITUTE OF SCIENCE AND TECHNOLOGY, Daejeon (KR)

(72) Inventors: Chan-Ju Song, Ulsan (KR); Sang Cheol Paik, Ulsan (KR); Sang-Goo Lee, Ulsan (KR); Min Kee Choi, Daejeon (KR); Myoung Yeob Kim, Daejeon (KR)

(73) Assignees: S-OIL CORPORATION, Seoul (KR); KOREA ADVANCED INSTITUTE OF SCIENCE AND TECHNOLOGY, Daejeon (KR)

(*) Notice: Subject to any disclaimer, the term of this patent is extended or adjusted under 35 U.S.C. 154(b) by 47 days.

(21) Appl. No.: 15/321,287

(22) PCT Filed: Jun. 26, 2014

(86) PCT No.: PCT/KR2014/005674
§ 371 (c)(1),
(2) Date: Dec. 22, 2016

(87) PCT Pub. No.: WO2015/199259
PCT Pub. Date: Dec. 30, 2015

(65) Prior Publication Data
US 2017/0158970 A1 Jun. 8, 2017

(30) Foreign Application Priority Data
Jun. 25, 2014 (KR) .................... 10-2014-0078068

(51) Int. Cl.
| | | |
|---|---|---|
| *B01J 29/85* | (2006.01) | |
| *C10G 45/64* | (2006.01) | |
| *B01J 29/04* | (2006.01) | |
| *B01J 35/10* | (2006.01) | |
| *B01J 37/04* | (2006.01) | |
| *C01B 39/54* | (2006.01) | |

(Continued)

(52) U.S. Cl.
CPC ............ *C10G 45/64* (2013.01); *B01J 29/041* (2013.01); *B01J 29/042* (2013.01); *B01J 29/043* (2013.01); *B01J 29/044* (2013.01); *B01J 29/045* (2013.01); *B01J 29/064* (2013.01); *B01J 29/076* (2013.01); *B01J 29/85* (2013.01); *B01J 35/1057* (2013.01); *B01J 35/1061* (2013.01); *B01J 35/1066* (2013.01); *B01J 35/1095* (2013.01); *B01J 37/0201* (2013.01); *B01J 37/04* (2013.01); *B01J 37/08* (2013.01); *B01J 37/10* (2013.01); *C01B 39/54* (2013.01); *C10G 45/60* (2013.01); *C10G 45/62* (2013.01); *B01J 2229/186* (2013.01); *C01P 2006/14* (2013.01); *C01P 2006/16* (2013.01)

(58) Field of Classification Search
CPC ...... B01J 29/041; B01J 29/042; B01J 29/043; B01J 29/044; B01J 29/045; B01J 29/85; B01J 2229/186; B01J 37/04; B01J 37/08; B01J 37/10; B01J 37/0201; B01J 35/1057; B01J 35/1061; B01J 35/1066; B01J 35/1095; C01B 39/54
USPC ............ 502/60, 74, 214; 423/700, 702, 710
See application file for complete search history.

(56) References Cited

U.S. PATENT DOCUMENTS

2008/0216650 A1 9/2008 Falconer et al.

FOREIGN PATENT DOCUMENTS

| KR | 1007272880000 | 6/2007 |
|---|---|---|
| KR | 1020130038354 | 4/2013 |
| KR | 1020130135224 | 12/2013 |

OTHER PUBLICATIONS

"Zhen et al.", "hierarchical SAPO-11 synthesis by carbon nanoparticles templating method and its application on n-dodecane hydroisomerization", Advanced Materials Research, vols. 912-914, pp. 168-171, 2014.*

(Continued)

*Primary Examiner* — Elizabeth D Wood
(74) *Attorney, Agent, or Firm* — Duane Morris LLP; Gregory M. Lefkowitz; Jason M. Nolan

(57) ABSTRACT

The present disclosure relates to a method for preparing a multi-level pore zeolite, including: (A) a step of mixing a silicon precursor, an aluminum precursor, a phosphorus precursor, a structure directing agent and water; a step of (B) adding phenylphosphonic acid, carbon black or a mixture thereof to the mixture prepared in the step (A) and mixing the same; a step of (C) crystallizing the mixture prepared in the step (B) by heat-treating the same; and a step of (D) calcining the crystallization product, and utilization of the prepared multi-level pore zeolite as a catalyst for hydroisomerization of normal paraffins. The catalyst exhibits improved isoparaffin yield when it is used as a catalyst for hydroisomerization of normal paraffins such as diesel or lube base oil by supporting an active metal component because residence time of reactants and products in the zeolite crystals are decreased due to mesopores and the proportion of external acid sites to total acid sites is low. Also, cloud point and pour point are effectively improved and high hydroisomerization reactivity is achieved without product loss.

15 Claims, 9 Drawing Sheets

(51) Int. Cl.
*B01J 37/08* (2006.01)
*C10G 45/60* (2006.01)
*C10G 45/62* (2006.01)
*B01J 37/10* (2006.01)
*B01J 29/064* (2006.01)
*B01J 29/076* (2006.01)
*B01J 37/02* (2006.01)

(56) References Cited

OTHER PUBLICATIONS

Liang, et al., "Synthesis and characterization of mesoporous SAPO-11 by using carbon particles", Advanced Materials Research vols. 306-307, pp. 1576-1579 (2011).

* cited by examiner

METHOD FOR MANUFACTURING OF MULTI-LEVEL PORE ZEOLITE AND UTILIZATION AS CATALYST FOR HYDROISOMERIZATION OF NORMAL PARAFFINS OF MULTI-LEVEL PORE ZEOLITE PREPARED THEREBY

CROSS-REFERENCE TO RELATED APPLICATIONS

This application is a § 371 national stage entry of International Application No. PCT/KR2014/005674, filed on Jun. 26, 2014, which claims priority to South Korean Patent Application No. 10-2014-0078068, filed on Jun. 25, 2014, the entire contents of which are incorporated herein by reference.

TECHNICAL FIELD

The present disclosure relates to a method for preparing a multi-level pore zeolite, which exhibits an improved isoparaffin yield and high hydroisomerization reactivity when used as a catalyst, and a method for utilizing a multi-level pore zeolite prepared thereby as a catalyst for hydroisomerization of normal paraffins.

BACKGROUND ART

Hydroisomerization is a reaction whereby normal paraffins are converted to isoparaffins and is considered as an important process in petroleum refining.

Since normal paraffins have high pour point, cloud point, etc., which are important factors of the flow characteristics of a liquid, long-carbon-chain hydrocarbon materials containing a lot of normal paraffins, such as diesel or lube base oil, are inadequate for use as fuel because they are easily solidified at low temperatures in the winter season. As a consequence, additives have to be mixed in diesel, lube base oil, etc. in order to improve the flow characteristics. But, if the normal paraffins are converted to isoparaffins, they can be immediately used as fuel without any additive because the flow characteristics of liquid such as pour point and cloud point are improved.

In general, the isoparaffins having improved flow characteristics of liquid are produced from hydroisomerization using a catalyst having a metal part and an acid part at the same time. As the metal part, a precious metal such as platinum (Pt) or palladium (Pd) supported on a support at 0.3-1.0 wt % is used in general. And, as the acid part, a zeolite having a 1-dimensional channel structure and having pores, each of which consists of 10 atoms is frequently used because it is known to prevent hydrocracking and give a high yield of mono-branched isomers.

Micropores (pore diameter <2 nm) present in common zeolites are disadvantageous in catalytic reactions in that the molecular diffusion of reactants (hydrocarbon materials containing normal paraffins) and products (hydrocarbon materials containing isoparaffins) is limited. In particular, for hydroisomerization, limited diffusion of the products, isoparaffins, causes hydrocracking inside the micropores and thus decreases the isoparaffin yield. To solve this problem, studies are under way on the synthesis of a zeolite having a large outer surface area to enhance molecular diffusion in the pores of the zeolite.

Zeolites have a wide variety of structures, including the AFI, AEL and CHA structures having pores consisting of 12, 10 and 8 atoms, respectively. The three-letter codes such as AFI, AEL, CHA, etc. designate the structure types defined by the International Zeolite Association and the pore structures and characteristics can be found in the published literature (*Chem. Review*, 99, 63). There are also zeolites containing metals other than aluminum, phosphorus and oxygen. For example, the AlPO (aluminophosphate)-based zeolites of the AEL structure containing Ti, V, Cr, Mn, Fe and Co metals are designated as TAPO, VAPO, CrAPO, MnAPO, FAPO and CoAPO, respectively. Also, numbers are used to designate different structures. For example, CoAPO-5, CoAPO-11 and CoAPO-34 designate the zeolites consisting of Co, Al, P and O, with the AFI, AEL and CHA structures, respectively.

A method of preparing the SAPO-11 zeolite by using an organosilane surfactant as a silicon precursor to improve material diffusion in the SAPO-11 zeolite was reported (M. Choi et al., *Chem. Commun.* 42; 4380, 2006). The SAPO-11 zeolite synthesized using the organosilane surfactant forms mesopores (pore diameter: 2-50 nm) during calcining as the structure directing agent and organic matter present in the organosilane are removed. As a result, material diffusion is improved.

Also, a method of preparing the SAPO-11 zeolite by using a surfactant (decyltrimethylammonium bromide ($C_{10}H_{21}(CH_3)_3NBr$), dodecyltrimethylammonium bromide ($C_{12}H_{25}(CH_3)_3NBr$), tetradecyltrimethylammonium bromide ($C_{14}H_{29}(CH_3)_3NBr$) or hexadecyltrimethylammonium bromide ($C_{16}H_{33}(CH_3)_3NBr$)) was disclosed (Lin Guo et al., *J. Catal.* 294; 161, 2012). When hydroisomerization of n-octane was conducted using a catalyst for hydroisomerization of normal paraffins prepared using the SAPO-11 zeolite synthesized by using the surfactant, the yield of multi-branched isomers including di-branched isoparaffins was increased by about 10% as compared to the conventional SAPO-11 zeolite.

However, there are problems that a catalyst for hydroisomerization of normal paraffins prepared using the SAPO-11 zeolite with increased outer surface area synthesized by using the organosilane surfactant exhibits low isoparaffin yield and the catalyst for hydroisomerization of normal paraffins prepared using the SAPO-11 zeolite synthesized by using the surfactant such as decyltrimethylammonium bromide ($C_{10}H_{21}(CH_3)_3NBr$), etc. is costly.

Accordingly, in order to solve these problems, a zeolite which is more economical and exhibits high isoparaffin yield and hydroisomerization reactivity and synthesis of a catalyst for hydroisomerization of normal paraffins using the same are necessary.

DISCLOSURE

Technical Problem

The present disclosure is directed to providing a method for preparing a multi-level pore zeolite, which exhibits improved isoparaffin yield in hydroisomerization of normal paraffins and exhibits high hydroisomerization reactivity and yield when used as a catalyst for hydroisomerization of normal paraffins, and the zeolite.

The present disclosure is also directed to providing a method for utilizing a multi-level pore zeolite prepared by the above method as a catalyst for hydroisomerization of normal paraffins.

Technical Solution

In an aspect, the present disclosure provides a method for preparing a multi-level pore zeolite, including: (A) a step of mixing a silicon precursor, an aluminum precursor, a phosphorus precursor, a structure directing agent and water; a step of (B) adding phenylphosphonic acid, carbon black or a mixture thereof to the mixture prepared in the step (A) and mixing the same; a step of (C) crystallizing the mixture prepared in the step (B) by heat-treating the same; and a step of (D) calcining the crystallization product.

In the step (A), the silicon precursor may be one or more selected from a group consisting of silica sol, fumed silica, tetraethyl orthosilicate and tetrapropyl orthosilicate; the aluminum precursor may be aluminum isopropoxide, pseudo-boehmite or a mixture thereof; the phosphorus precursor may be phosphoric acid, phosphorous acid or a mixture thereof; and the structure directing agent may be one or more selected from a group consisting of dipropylamine, triethylamine, tripropylamine, dibutylamine and heptylamine.

In the step (B), when the phenylphosphonic acid is added alone, a molar ratio of the water/phenylphosphonic acid is 45.5-1,000; a molar ratio of the structure directing agent/phenylphosphonic acid is 0.9-38.0; a molar ratio of the phosphorus precursor/phenylphosphonic acid is 1.8-40.0; and a molar ratio of total phosphorus ($P_2O_5$) contained in the phosphorus precursor and phenylphosphonic acid/aluminum ($Al_2O_3$) is 1.0-1.6.

In the step (B), when the carbon black is added alone, it is added in an amount of 1-250 parts by weight based on 100 parts by weight of the multi-level pore zeolite; and a weight ratio of the structure directing agent/carbon black is 0.5-50.

In the step (B), when a mixture of the phenylphosphonic acid and the carbon black is added, a molar ratio of the water/phenylphosphonic acid is 45.5-1,000; a molar ratio of the structure directing agent/phenylphosphonic acid is 0.9-46.0; a molar ratio of the phosphorus precursor/phenylphosphonic acid is 1.8-40.0; a molar ratio of total phosphorus ($P_2O_5$) contained in the phosphorus precursor and phenylphosphonic acid/aluminum ($Al_2O_3$) is 1.0-1.6; and the carbon black is added in an amount of 1-250 parts by weight based on 100 parts by weight of the multi-level pore zeolite.

In the step (A), a molar ratio of aluminum ($Al_2O_3$)/silicon ($SiO_2$) is 2-20.

The multi-level pore zeolite prepared by adding the phenylphosphonic acid, the carbon black or a mixture of the carbon black and the phenylphosphonic acid has a value of the proportion of external Brønsted acid sites/outer surface area (accessibility factor (%)/$S_{ext}$) which is 0.4 or smaller. The proportion of external Brønsted acid sites is the amount of external Brønsted acid sites/the amount of total Brønsted acid sites×100.

The multi-level pore zeolite prepared by adding the phenylphosphonic acid, the carbon black or a mixture of the carbon black and the phenylphosphonic acid may have mesopores having an average diameter of 1-50 nm and may contain mesopores having a diameter of 2.0-50.0 nm with 50-70 vol % based on the volume of the total pores.

In another aspect, the present disclosure provides a catalyst for hydroisomerization of normal paraffins, which is prepared by supporting an active metal component on the multi-level pore zeolite. The prepared catalyst may be used as a catalyst for hydroisomerization of normal paraffins for hydrocarbon materials such as diesel or lube base oil.

The active metal component may be one or more selected from a group consisting of platinum (Pt), palladium (Pd), ruthenium (Ru), iron (Fe), nickel (Ni), cobalt (Co) and molybdenum (Mo). The content of the active metal component is 0.1-30 wt %, specifically 0.5-10 wt %, based on the multi-level pore zeolite.

In another aspect, the present disclosure provides a method for hydroisomerizing normal paraffins, which is performed for hydrocarbon materials at a reaction temperature of 200-400° C., a hydrogen pressure of 1-200 atm, a liquid space velocity of 1-8 h$^{-1}$ and a hydrogen consumption rate of 500-12,000 scf/B in the presence of the catalyst in which the active metal component is supported.

When used for hydroisomerization of n-dodecane, the prepared catalyst for hydroisomerization of normal paraffins results in the proportion of multi-branched isomers including di-branched isomers in the produced isoparaffins of 30% or greater.

The prepared catalyst for hydroisomerization of normal paraffins can be used as a catalyst which is capable of effectively improving cloud point and pour point for hydrocarbon materials such as diesel or lube base oil.

Advantageous Effects

A multi-level pore zeolite of the present disclosure shows high hydroisomerization reactivity even at low reaction temperature when used as a catalyst because of fast molecular diffusion in crystals owing to its mesopores. In addition, it exhibits improved isoparaffin yield as compared to the existing zeolite wherein molecular diffusion is limited due to the absence of mesopores because the residence time of reactants and products in the zeolite crystals are decreased and thus hydrocracking can be inhibited. Furthermore, a multi-level pore zeolite prepared by adding phenylphosphonic acid, carbon black or a mixture of phenylphosphonic acid and carbon black exhibits improved isoparaffin yield as compared to the general zeolite because nonselective hydrocracking that may occur at outer surface can be inhibited since the proportion of external acid sites to total acid sites is low. In addition, it is economically favorable because a multi-level pore zeolite having mesopores is prepared using inexpensive phenylphosphonic acid and carbon black. Moreover, because a catalyst wherein a metal is supported on the multi-level pore zeolite can effectively improve cloud point and pour point for hydrocarbon materials such as diesel or lube base oil when utilized as a catalyst for hydroisomerization of normal paraffins, it can be used a catalyst for hydroisomerization of normal paraffins in diesel or lube base oil.

BEST MODE

Figure 1:
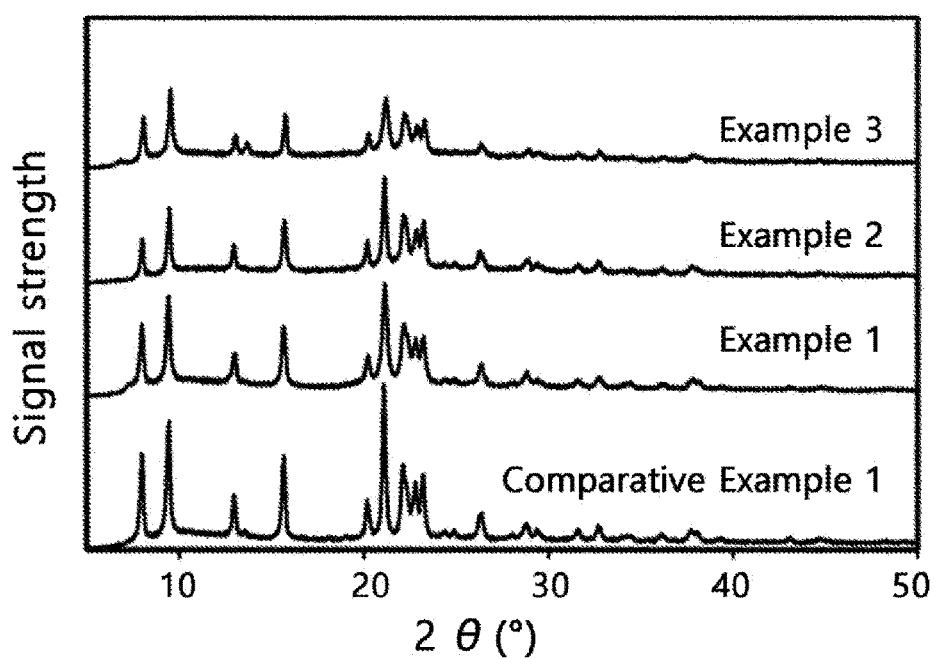
FIG. 1 shows the XRD spectra of zeolites prepared in examples and a comparative example.

The present disclosure relates to a method for preparing a multi-level pore zeolite, which exhibits an improved isoparaffin yield and high hydroisomerization reactivity when used as a catalyst, and a utilization of a multi-level pore zeolite prepared thereby as a catalyst for hydroisomerization of normal paraffins.

The multi-level pore zeolite of the present disclosure is SAPO-11 having a 1-dimensional channel structure. It has the aluminophoshate-11 (AEL) structure and has additional mesopores.

Multi-level porosity means that mesopores and micropores are present at the same time and are arranged regularly.

Hereinafter, the present disclosure is described in detail.

A method for preparing a multi-level pore zeolite of the present disclosure includes: (A) a step of mixing a silicon precursor, an aluminum precursor, a phosphorus precursor, a structure directing agent and water; a step of (B) adding phenylphosphonic acid, carbon black or a mixture thereof to the mixture prepared in the step (A) and mixing the same; a step of (C) crystallizing the mixture prepared in the step (B) by heat-treating the same and then cooling to room temperature; and a step of (D) calcining the cooled crystallization product.

First, in the step (A), a silicon precursor, an aluminum precursor, a phosphorus precursor, a structure directing agent and water are mixed.

The silicon precursor may be one or more selected from a group consisting of silica sol, fumed silica, tetraethyl orthosilicate and tetrapropyl orthosilicate.

The aluminum precursor may be aluminum isopropoxide, pseudoboehmite or a mixture thereof.

The phosphorus precursor may be phosphoric acid ($H_3PO_4$), phosphorous acid ($H_3PO_3$) or a mixture thereof.

And, the structure directing agent may be one or more selected from a group consisting of dipropylamine, triethylamine, tripropylamine, dibutylamine and heptylamine.

A molar ratio of aluminum ($Al_2O_3$)/silicon ($SiO_2$) is 2-20, specifically 4-15. When the molar ratio of aluminum ($Al_2O_3$)/silicon ($SiO_2$) is outside this range, a zeolite having a structure other than the AEL structure may be formed.

Next, in the step (B), a gel-type mixture is prepared by adding phenylphosphonic acid, carbon black or a mixture thereof to the mixture prepared in the step (A) and mixing at 23-27° C. The phenylphosphonic acid, the carbon black or a mixture thereof may be either added to the mixture prepared in the step (A) or mixed with the materials in the step (A).

As the phenylphosphonic acid, the carbon black or a mixture thereof is added to the mixture prepared in the step (A), mesopores and micropores of various sizes may be formed in the zeolite. The pores formed in the zeolite have an average diameter of 1-50 nm. Among them, micropores having a diameter of 0.1-1.9 nm are included in an amount of 10-30 vol % based on the volume of the total pores, mesopores having a diameter of 2.0-50.0 nm are included in an amount of 30-70 vol % based on the volume of the total pores and macropores having a diameter of 50.1-60.0 nm are included in an amount of 5-20 vol % based on the volume of the total pores.

When the phenylphosphonic acid, the carbon black or a mixture thereof is not added, low isoparaffin yield and hydroisomerization reactivity are achieved because mesopores and micropores of various sizes, particularly mesopores having a particle diameter of 10-30 nm, are not formed in large amounts.

When the phenylphosphonic acid is added alone, a molar ratio of the water/phenylphosphonic acid is 45.5-1,000, specifically 50-500; a molar ratio of the structure directing agent/phenylphosphonic acid is 0.9-38.0, specifically 1.3-20; a molar ratio of the phosphorus precursor/phenylphosphonic acid is 1.8-40.0, specifically 1.8-25; and a molar ratio of total phosphorus ($P_2O_5$) contained in the phosphorus precursor and phenylphosphonic acid/aluminum ($Al_2O_3$) is 1.0-1.6, specifically 1.2-1.5. If the molar ratios are outside the above ranges, mesopores of various sizes may not be formed sufficiently or pores having a size of 10-30 nm may not be formed in large quantities. And, if the molar ratios are quite distant from these ranges, zeolites other than the AEL zeolite having a 1-dimensional structure and having pores, each of which consists of 10 atoms, and having a size of 0.40-0.65 nm may be formed.

The amount of the carbon black is not particularly limited as long as it can be removed during calcining. Specifically, when the carbon black is added alone, it is added in an amount of 1-250 parts by weight based on 100 parts by weight of the multi-level pore zeolite and a weight ratio of the structure directing agent/carbon black is 0.5-50, specifically 1-40. If the content of the carbon black is outside the above range, mesopores of various sizes may not be formed sufficiently or pores having a size of 10-30 nm may not be formed in large quantities. And, if the weight ratio is quite distant from the above range, it may be difficult to form the multi-level pore zeolite of the present disclosure having the AEL structure.

When a mixture of the phenylphosphonic acid and the carbon black is added, a molar ratio of the water/phenylphosphonic acid is 45.5-1,000, specifically 50-500; a molar ratio of the structure directing agent/phenylphosphonic acid is 0.9-46.0, specifically 1.5-30; a molar ratio of the phosphorus precursor/phenylphosphonic acid is 1.8-40.0, specifically 1.8-25; and a molar ratio of total phosphorus ($P_2O_5$) contained in the phosphorus precursor and phenylphosphonic acid/aluminum ($Al_2O_3$) is 1.0-1.6, specifically 1.2-1.5. And, the carbon black is added in an amount of 1-250 parts by weight based on 100 parts by weight of the multi-level pore zeolite. If the molar ratio and the content of the carbon black are outside the above ranges, the same problems may occur as when the phenylphosphonic acid or the carbon black is used alone.

Next, in the step (C), the gel-type mixture prepared in the step (B) is crystallized to a zeolite by heat-treating the same and then cooled to room temperature.

The crystallization is performed at 150-200° C. for 24-168 hours. Specifically, it is performed at 150-200° C. for 24-72 hours when the phenylphosphonic acid is used alone and is performed at 150-200° C. for 24-168 hours when the carbon black alone or a mixture of the phenylphosphonic acid and the carbon black is used.

Next, in the step (D), the crystallized zeolite is calcined to improve the performance of the zeolite. Through the calcining, the structure directing agent, the benzyl group of the phenylphosphonic acid, the carbon black are removed, water inside the pores is completely removed and the thermal and mechanical durability of the zeolite are improved.

Specifically, the calcining is performed at 400-700° C. for 8-15 hours.

The prepared multi-level pore zeolite has pores having an average diameter of 1-50 nm. Among them, micropores having a diameter of 0.1-1.9 nm are included in an amount of 10-30 vol % based on the volume of the total pores, mesopores having a diameter of 2.0-50.0 nm are included in an amount of 50-70 vol % based on the volume of the total pores and macropores having a diameter of 50.1-60.0 nm are included in an amount of 5-20 vol % based on the volume of the total pores. In particular, among the mesopores having a diameter of 2.0-50.0 nm, those having a diameter of 10-30 nm are included in an amount of 30-40 vol % based on the volume of the total pores. When the prepared multi-level pore zeolite is used as a support for a catalyst for hydroisomerization of normal paraffins, high isoparaffin yield and superior hydroisomerization reactivity are achieved.

Further, a catalyst for hydroisomerization of normal paraffins may be prepared by including a step of supporting an active metal component on the multi-level pore zeolite and calcining the same. The active metal component may be one or more selected from a group consisting of platinum (Pt), palladium (Pd), ruthenium (Ru), iron (Fe), nickel (Ni), cobalt (Co) and molybdenum (Mo).

The content of the active metal component is 0.1-30 wt %, specifically 0.5-10 wt %, based on the multi-level pore zeolite.

MODE FOR INVENTION

Hereinafter, the present disclosure will be described in detail through specific examples. However, the following examples are for illustrative purposes only and it will be apparent to those of ordinary skill in the art that the scope of the present disclosure is not limited by the examples.

Example 1. Preparation of Multi-Level Pore Zeolite Using Phenylphosphonic Acid

A gel was prepared by stirring tetraethyl orthosilicate (Si(OC$_2$H$_5$)$_4$, 98%, Aldrich), aluminum isopropoxide (Al(i-O—Pr)$_3$, 98%, Aldrich), phosphoric acid (H$_3$PO$_4$, 85 wt % in H$_2$O, Junsei), dipropylamine (C$_6$H$_{15}$N, >99%, TCI), phenylphosphonic acid (C$_6$H$_7$O$_3$P, 98%, Aldrich) and water at room temperature (25° C.), crystallized in a stainless steel autoclave at 170° C. for 48 hours and then cooled to room temperature. The cooled crystallization product was filtered, washed several times with distilled water, dried at 100° C. and then calcined at 600° C. for 10 hours to prepare a multi-level pore zeolite.

The multi-level pore zeolite had a molar ratio of water/phenylphosphonic acid of 55.6, a molar ratio of dipropylamine/phenylphosphonic acid of 1.4, a molar ratio of phosphoric acid/phenylphosphonic acid of 2.2 and a molar ratio of total phosphorus contained in phosphoric acid and phenylphosphonic acid (P$_2$O$_5$)/aluminum (Al$_2$O$_3$) of 1.4. The composition of the prepared multi-level pore zeolite was as follows.

1.0Al$_2$O$_3$:1.0P$_2$O$_5$:1.3DPA:0.2SiO$_2$:50H$_2$O:0.9C$_6$H$_7$O$_3$P

Example 2. Preparation of Multi-Level Pore Zeolite Using Carbon Black

A multi-level pore zeolite was prepared in the same manner as in Example 1, except that carbon black was used instead of phenylphosphonic acid and crystallization was performed at 185° C. for 120 hours.

The carbon black was added in an amount of 100 parts by weight based on 100 parts by weight of the multi-level pore zeolite and a weight ratio of dipropylamine/carbon black was 0.6. The composition of the prepared multi-level pore zeolite was as follows.

1.0Al$_2$O$_3$:1.0P$_2$O$_5$:1.4DPA:0.2SiO$_2$:50H$_2$O:100carbon black

Example 3. Preparation of Multi-Level Pore Zeolite Using Phenylphosphonic Acid and Carbon Black A multi-level pore zeolite was prepared in the same manner as in Example 1, except that a mixture of phenylphosphonic acid and carbon black was used instead of phenylphosphonic acid and crystallization was performed at 185° C. for 120 hours.

The multi-level pore zeolite had a molar ratio of water/phenylphosphonic acid of 55.6, a molar ratio of dipropylamine/phenylphosphonic acid of 2.1, a molar ratio of phosphoric acid/phenylphosphonic acid of 2.2 and a molar ratio of total phosphorus contained in phosphoric acid and phenylphosphonic acid (P$_2$O$_5$)/aluminum (Al$_2$O$_3$) of 1.4. The composition of the prepared multi-level pore zeolite was as follows.

1.0Al$_2$O$_3$:1.0P$_2$O$_5$:1.9DPA:0.2SiO$_2$:50H$_2$O:0.9C$_6$H$_7$O$_3$P: 100carbon black Comparative Example 1

A general SAPO-11 zeolite with no phenylphosphonic acid was prepared as in Example 1, with the composition of dipropylamine as 1.2. The zeolite was synthesized by crystallizing at 185° C. for 48 hours. The composition of the prepared zeolite was as follows.

1.0Al$_2$O$_3$:1.0P$_2$O$_5$:1.2DPA:0.2SiO$_2$:50H$_2$O

Test Example 1. XRD, SEM, TEM, Nitrogen (N$_2$) Physisorption and IR Measurements FIG. 1 shows the XRD spectra of the multi-level pore zeolites prepared in the examples and the zeolite prepared in the comparative example, FIG. 2 shows the SEM images of the multi-level pore zeolites prepared in the examples and the zeolite prepared in the comparative example and FIG. 3 shows the TEM images of the multi-level pore zeolites prepared in the examples and the zeolite prepared in the comparative example.

Figure 2:
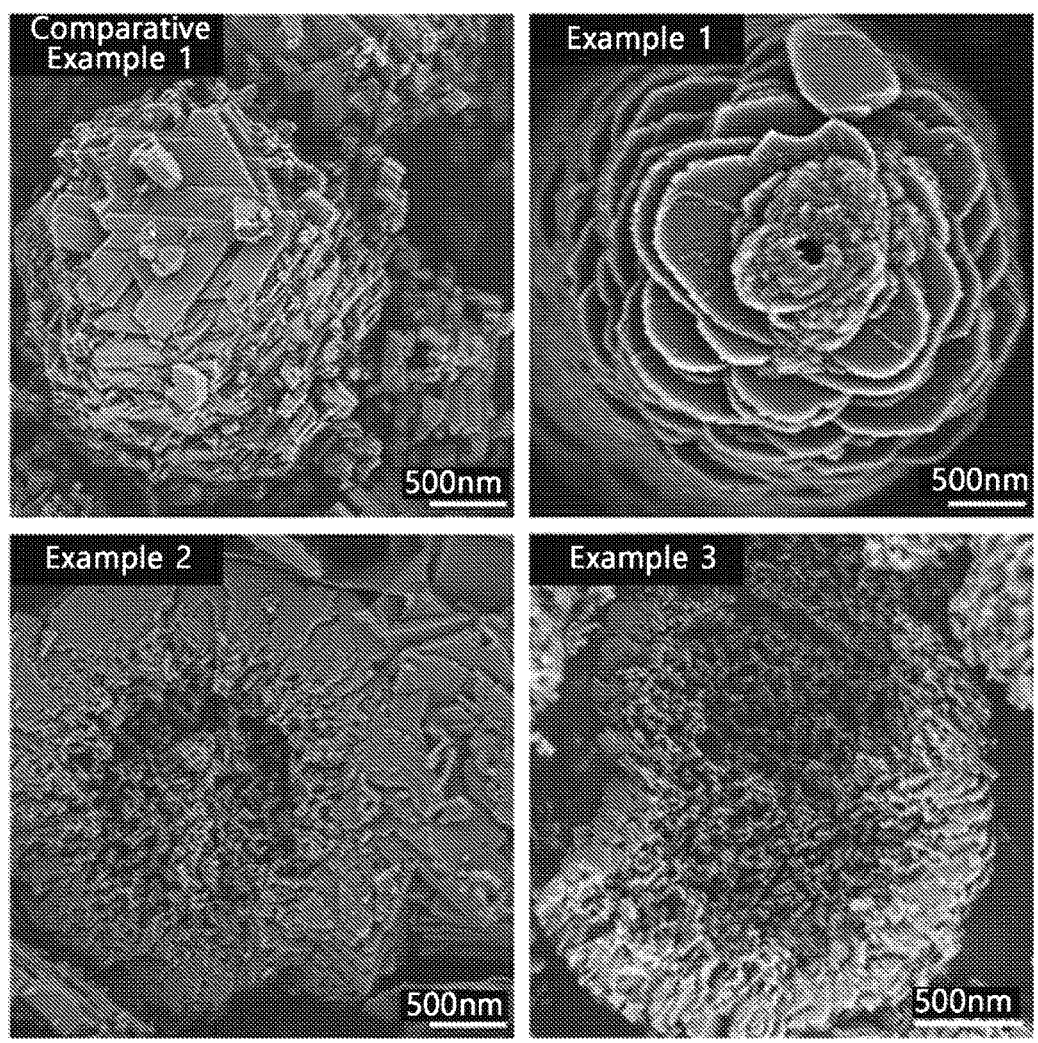
FIG. 2 shows the SEM images of zeolites prepared in examples and a comparative example.
Figure 3:
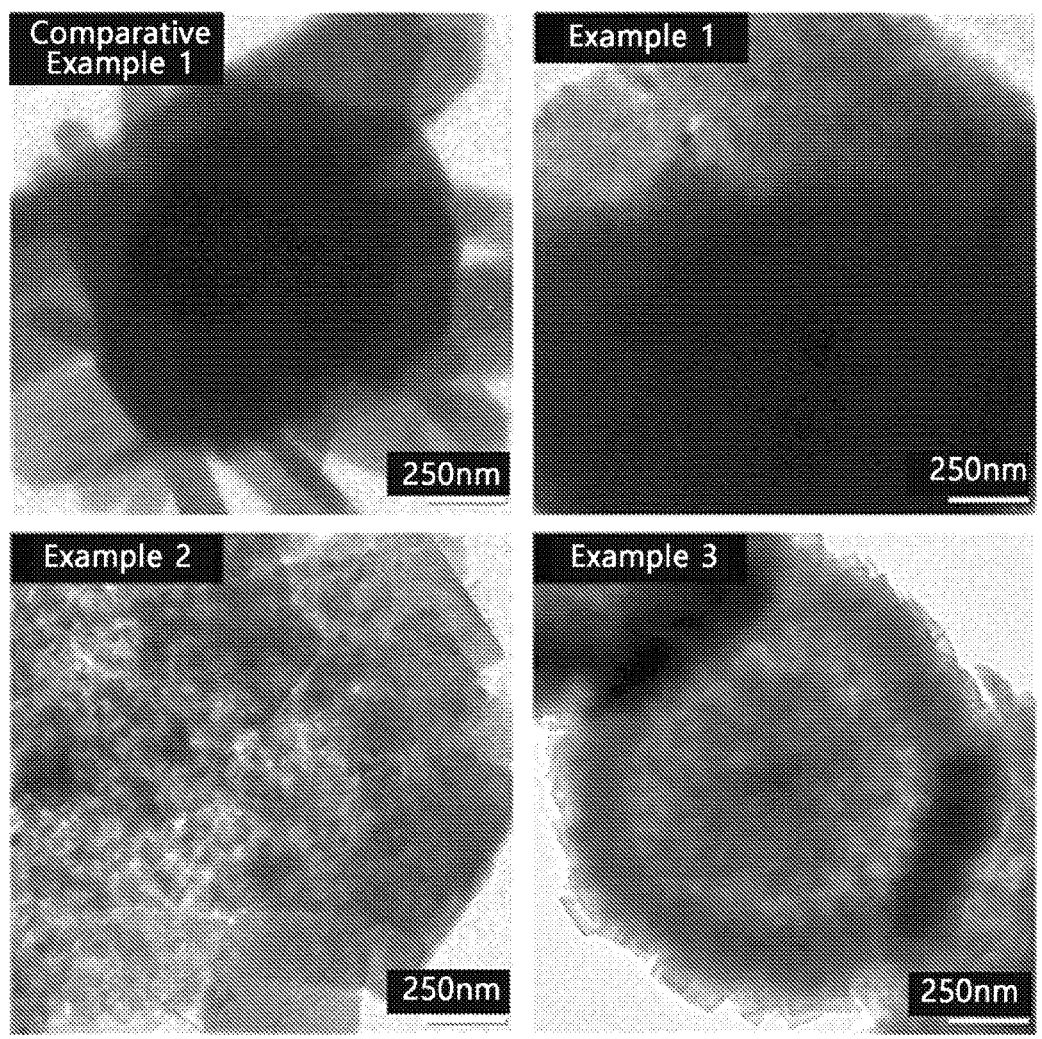
FIG. 3 shows the TEM images of zeolites prepared in examples and a comparative example.

As seen from FIGS. 1-3, the multi-level pore zeolites prepared in Examples 1-3 were AEL zeolites having mesopores and micropores with different sizes. In contrast, the zeolite prepared in Comparative Example 1 had micropores only.

In FIG. 2, the magnification of SEM was ×25,000 for Example 1, ×25,000 for Example 2, ×35,000 for Example 3 and ×12,000 for Comparative Example 1.

Nitrogen ($N_2$) physisorption analysis was conducted to measure the outer surface area of the multi-level pore zeolites prepared in the examples and the zeolite prepared in the comparative example. 0.1 g of the zeolites prepared in the examples and the comparative example were pretreated at 400° C. for 4 hours in vacuum and nitrogen was adsorbed at −196° C. The amount of adsorbed nitrogen gas was measured and the outer surface area of the zeolites was obtained using the t-plot method. The result is shown in Table 1 as $S_{ext}$ (m²/g).

In addition, FT-IR analysis was conducted using pyridine and 2,6-di-t-butylpyridine as adsorbates in order to measure the amount of total acid sites and external acid sites of the multi-level pore zeolites prepared in the examples and the zeolite prepared in the comparative example.

The multi-level pore zeolites prepared in the examples and the zeolite prepared in the comparative example were prepared into circular pellets with a weight of 15 mg and a diameter of 13 mm and pretreated at 450° C. for 4 hours in an IR cell in vacuum. After the pretreatment, background data were obtained by cooling to room temperature and then pyridine or 2,6-di-t-butylpyridine vapor was adsorbed in-situ at room temperature for 2 hours. Then, after desorbing the physisorbed and weakly adsorbed pyridine or 2,6-di-t-butylpyridine at 150° C. for 2 hours, IR analysis was conducted after cooling to room temperature. Finally, area value was calculated by subtracting the background data from the desorption data obtained at 150° C. For quantitative analysis, the molar extinction coefficient values were set to 5.98 cm μmol$^{-1}$ for pyridine and 10.10 cm μmol$^{-1}$ for 2,6-di-t-butylpyridine.

The result of quantitative analysis based on FT-IR is shown in [Table 1].

TABLE 1

| | Acidity (mol/g) | | | | |
|---|---|---|---|---|---|
| | Total Brønsted acid sites (Py-IR) | External Brønsted acid sites (2,6-DTBPy-IR) | $S_{ext}$ (m²/g) | Accessibility factor (%) | Accessibility factor (%)/$S_{ext}$ |
| Comparative Example 1 | 169 | 46.3 | 50 | 27 | 0.55 |
| Example 1 | 170 | 32.5 | 50 | 19 | 0.38 |
| Example 2 | 186 | 43.6 | 80 | 23 | 0.29 |
| Example 3 | 132 | 25.8 | 70 | 20 | 0.28 |

As seen from Table 1, the multi-level pore zeolites prepared in Examples 1-3 according to the present disclosure showed lower accessibility factor (%) than the zeolite of Comparative Example 1. Also, the accessibility factor (%)/$S_{ext}$ values were lower for Examples 1-3 than for Comparative Example 1.

The $S_{ext}$ means the outer surface area and the accessibility factor (%) is the value of the amount of external Brønsted acid site/the amount of total Brønsted acid sites×100.

Test Example 2. Measurement of Hydroisomerization Reactivity for Normal Paraffins Preparation of Supported Catalyst After supporting platinum by incipient wetness impregnation using aqueous solutions containing the zeolite powders prepared in Examples 1-3 and Comparative Example 1 and a platinum precursor and drying in an oven at 100° C. for 4 hours or longer, platinum-supported catalysts for hydroisomerization of normal paraffins were obtained by calcining the dried powder samples at 400° C. for 3 hours under a dry air atmosphere. The loading amount of the supported platinum was 1 wt % based on the support.

As the platinum precursor, $Pt(NH_3)_4(NO_3)_2$ or $Pt(NH_3)_4Cl_2 \cdot xH_2O$ can be used. In the present disclosure, $Pt(NH_3)_4(NO_3)_2$ was used as the platinum precursor.

Measurement of Hydroisomerization Reactivity

Hydroisomerization was conducted using the catalyst for hydroisomerization of normal paraffins prepared using the zeolites of the examples and the comparative example for preparing isoparaffins from normal paraffins corresponding to diesel or lube base oil.

In general, the hydroisomerization is conducted at a reaction temperature of 200-400° C. with a hydrogen pressure of 1-200 atm. For example, the reaction temperature may be 280-350° C. and the hydrogen pressure may be 5-30 atm. Before conducting the reaction, the catalysts were compressed into circular discs, cut to a size of 150-200 mm, loaded into a stainless steel fixed-bed continuous flow reactor with an inner diameter of ½ inch and then reduced at 400° C. in-situ under a hydrogen atmosphere. The reaction was conducted using n-dodecane ($C_{12}H_{26}$, TCI) as a typical reactant with a space velocity of 2-8 h$^{-1}$ and a hydrogen consumption rate of 500-12,000 scfb/B.

Figure 4:
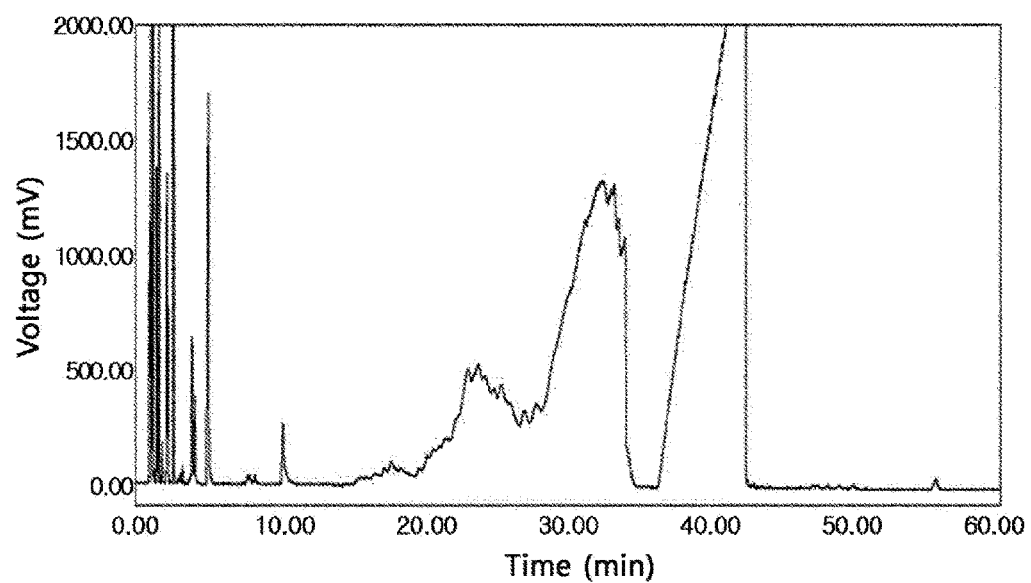
FIG. 4 shows a result of conducting hydroisomerization of n-dodecane using catalysts for hydroisomerization of normal paraffins prepared in examples and a comparative example and analyzing the produced isoparaffins by gas chromatography.

The products were analyzed by off-line gas chromatography. The analysis was conducted by maintaining temperature at 40° C. for 5 minutes and then increasing to 250° C. at a rate of 0.5° C./min. In FIG. 4, the area of the region of 18-32 minutes was calculated as that of multi-branched isomers including di-branched isomers and the area of the region of 32-38 minutes was calculated as that of mono-branched isomers. The proportion of the multi-branched isomers including di-branched isomers to the produced isoparaffins was calculated from the proportion of the area of the multi-branched isomers including di-branched isomers to that of the produced isoparaffins.

The conversion of n-dodecane was calculated from $$\frac{(n - C_{12} \text{ mol})_{in} - (n - C_{12} \text{ mol})_{out}}{(n - C_{12} \text{ mol})_{in}} \times 100$$

and the yield of dodecane isomers was calculated from $$\frac{(iso - C_{12} \text{ mol})_{out}}{(n - C_{12} \text{ mol})_{in}} \times 100.$$

Figure 5:
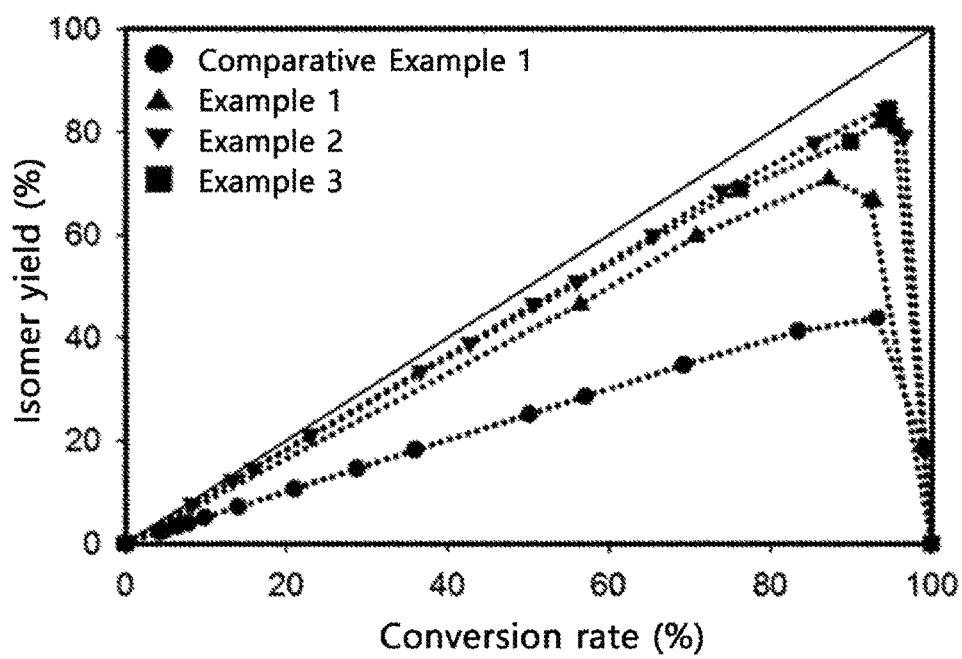
FIG. 5 shows a result of conducting hydroisomerization of n-dodecane using catalysts for hydroisomerization of normal paraffins prepared in examples and a comparative example.

When the hydroisomerization was conducted using n-dodecane as the reactant, the yield of dodecane isomers was 44% at maximum when the catalyst for hydroisomerization of normal paraffins of Comparative Example 1 was used and was 70% at maximum when the catalyst for hydroisomerization of normal paraffins of Example 1 was used, as can be seen from FIG. 5. When the catalyst for hydroisomerization of normal paraffins of Example 2 was used the maximum yield of dodecane isomers was 85%, and when the catalyst for hydroisomerization of normal paraffins of Example 3 was used the maximum yield of dodecane isomers was also 85%. It is thought that the isoparaffin yield was increased because the residence time of the reactant in the zeolite crystals during the hydroisomerization was decreased due to the mesopores additionally formed in the multi-level pore zeolites and, thus, hydrocracking was inhibited. Also, it is thought that the isoparaffin yield was increased because nonselective hydrocracking that may occur on the outer surface of the zeolites was inhibited because the multi-level pore zeolites prepared in Examples 1-3 have less external acid sites among the total acid sites as compared to the zeolite prepared in Comparative Example 1, as can be seen from [Table 1] in Test Example 1.

Among the isomers produced through the hydroisomerization, the multi-branched isomers including di-branched isomers can improve the flow characteristics of liquid fuel because they have lower pour point or cloud point than the mono-branched isomers. The result of conducting the hydroisomerization of n-dodecane using the catalysts for hydroisomerization of normal paraffins prepared in the comparative example and the examples and investigating the yields of mono-branched isomers and multi-branched isomers including di-branched isomers in the produced dodecane isomers is shown in FIG. 6.

Figure 6:
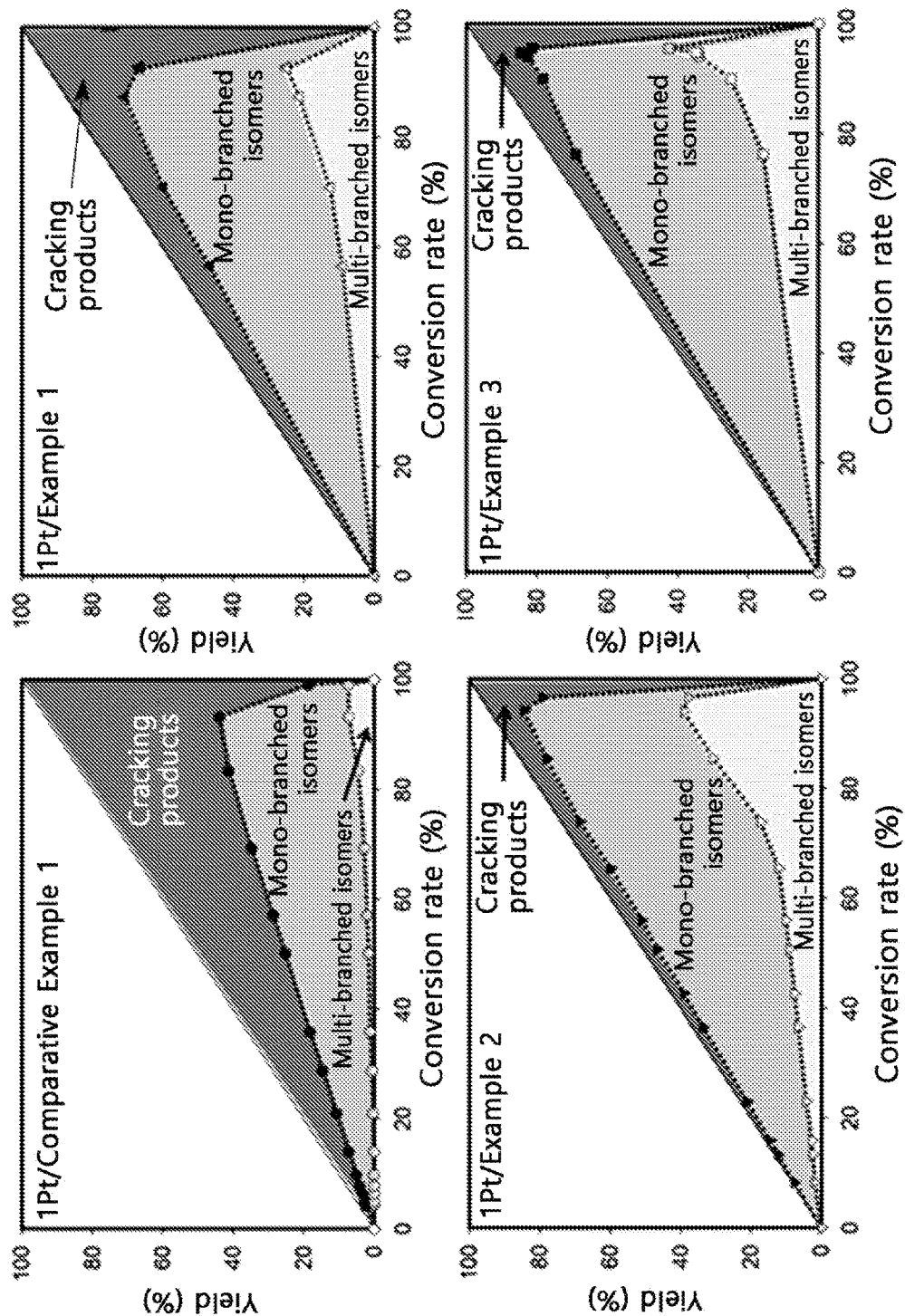
FIG. 6 shows a result of conducting hydroisomerization of n-dodecane using catalyst for hydroisomerization of normal paraffins synthesized using zeolites prepared in examples and a comparative example as supports. The amounts of mono-branched isomers, multi-branched isomers including di-branched isomers and cracking products are shown as functions of a conversion rate.

As seen from FIG. 6, when the catalyst for hydroisomerization of normal paraffins of Comparative Example 1 was used, the maximum isoparaffin yield was 40% and the yield of multi-branched isomers including di-branched isomers was 7%. When the catalyst for hydroisomerization of normal paraffins of Example 1 was used, the maximum isoparaffin yield was 70% and the yield of multi-branched isomers including di-branched isomers was about 25%. When the catalyst for hydroisomerization of normal paraffins of Example 2 was used, the maximum isoparaffin yield was 85% and the yield of multi-branched isomers including di-branched isomers was 39%. And, when the catalyst for hydroisomerization of normal paraffins of Example 3 was used, the maximum isoparaffin yield was 85% and the yield of multi-branched isomers including di-branched isomers was 34%. The proportion of the yield of multi-branched isomers including di-branched isomers to the maximum isoparaffin yield was 17.5% when the catalyst for hydroisomerization of Comparative Example 1 was used and about 36% when the catalyst for hydroisomerization of Example 1 was used. The proportion of the yield of multi-branched isomers including di-branched isomers to the maximum isoparaffin yield was about 46% when the catalyst for hydroisomerization of Example 2 was used and about 39% when the catalyst for hydroisomerization of Example 3 was used. In particular, when the catalyst for hydroisomerization of Example 3 was used, the yield of multi-branched isomers including di-branched isomers was increased to 42% when the conversion rate was 95% and the isoparaffin yield was 81%. In this case, the proportion of the yield of multi-branched isomers including di-branched isomers to the isoparaffin yield was about 52%.

Through this, it can be seen that the catalysts for hydroisomerization of normal paraffins prepared from the zeolites of Examples 1-3, which has additionally formed mesopores and has fewer external acid sites among the total acid sites as compared to that prepared from the zeolite of Comparative Example 1, which has micropores only, exhibits superior isoparaffin yield and yield of multi-branched isomers including di-branched isomers.

Figure 7:
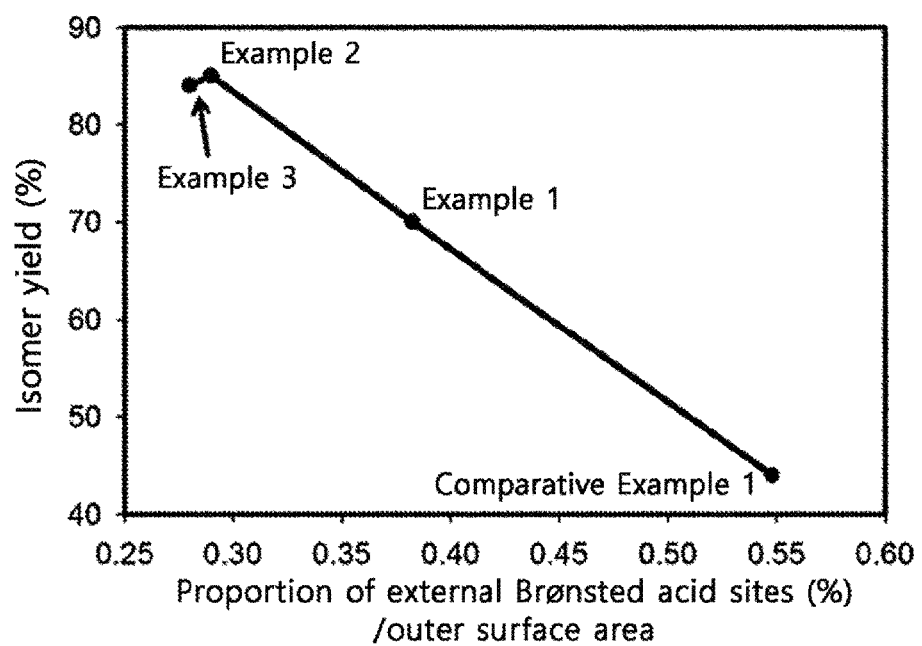
FIG. 7 shows a result of comparing a relationship between the outer surface area of zeolites prepared in examples and a comparative example obtained through nitrogen physisorption analysis and (the amount of external Brønsted acid sites/the amount of total Brønsted acid sites×100) obtained through FT-IR analysis using pyridine and 2,6-di-t-butylpyridine as a function of reaction yield in hydroisomerization of n-dodecane conducted using the catalysts for hydroisomerization of normal paraffins.

The relationship between dodecane isomer yields and the ratio of accessibility factor (%) over outer surface area of the zeolite obtained from the FT-IR and $N_2$ physisorption (Test Example 1) is shown in FIG. 7. In FIG. 7, the accessibility factor (%) represents the proportion of external acid sites/total acid sites. It can be seen that the yield of dodecane isomers increases as the amount of external acid sites of the synthesized zeolite is smaller and the amount of outer surface area is larger. This suggests that the dodecane isomers produced through the hydroisomerization inhibit nonselective hydrocracking on the outer surface of the zeolite and the additionally formed mesopores inhibit hydrocracking by reducing the residence time in the zeolite crystals, thereby increasing the yield of the isomers.

Test Example 3. Measurement of Hydroisomerization Reactivity for Liquid Paraffins Corresponding to Diesel Hydroisomerization was conducted for a feed sample corresponding to diesel using the catalyst for hydroisomerization of normal paraffins prepared from the zeolite of Example 3. The carbon distribution of the sample is shown in [Table 2] and the result of analyzing the sample by gas chromatography is shown in FIG. 8.

TABLE 2

| | $C_{10}$ | $C_{11}$ | $C_{12}$ | $C_{13}$ | $C_{14}$ | $C_{15}$ | $C_{16}$ | $C_{17}$ | $C_{18}$ | $C_{19}$ | $C_{20}$ | $C_{21}$ | $C_{22}$ | $C_{23}$ | $C_{24}$ | $C_{25}$ | $C_{26}$ | $C_{27}$ | $C_{28}$ |
|---|---|---|---|---|---|---|---|---|---|---|---|---|---|---|---|---|---|---|---|
| Mol % | 1.8 | 3.1 | 5.5 | 8.2 | 11.1 | 12.2 | 11.6 | 11.3 | 9.3 | 7.8 | 5.0 | 4.0 | 3.0 | 2.3 | 1.6 | 1.0 | 0.6 | 0.3 | 0.2 |

Figure 8:
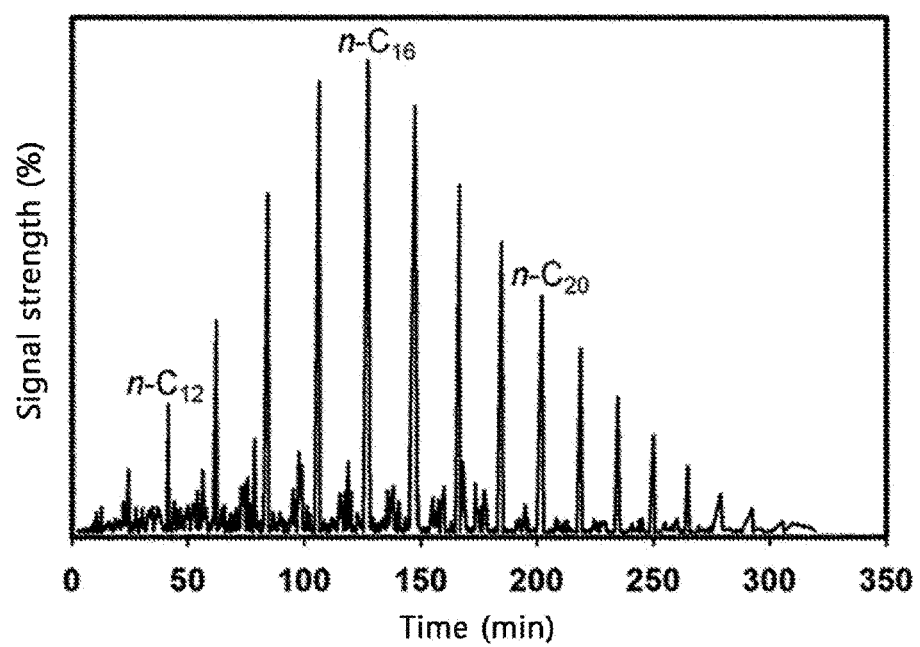
FIG. 8 shows a result of analyzing a liquid material corresponding to diesel, which is used in hydroisomerization, by gas chromatography.

As seen from Table 2, 89% or more of the feed sample corresponding to diesel was hydrocarbons with a chain length of 12-22 and most of the hydrocarbons were normal paraffins (FIG. 8).

Hydroisomerization was conducted for the feed sample corresponding to diesel using the catalyst for hydroisomerization of normal paraffins prepared from the zeolite of Example 3 at different reaction temperatures. The result is shown in [Table 3].

TABLE 3

| | Diesel feed sample | Reaction temperature | | | |
|---|---|---|---|---|---|
| | | 267° C. | 273° C. | 278° C. | 287° C. |
| Conversion rate (%) | — | 47.5 | 53.0 | 67.4 | 78.6 |
| Liquid yield (%) | — | 99.3 | 98.4 | 96.6 | 94.5 |
| Cloud point (° C.) | −1 | −22 | −27 | −35 | −52 |

TABLE 3-continued

|  |  | Diesel feed sample | Reaction temperature | | | |
|---|---|---|---|---|---|---|
|  |  |  | 267° C. | 273° C. | 278° C. | 287° C. |
| Pour point (° C.) |  | −8 | −26 | −30 | −42 | −55 or lower |
| Sulfur content (ppm) |  | 8 | 1 or less | 1 or less | 1 or less | 1 or less |
| Total aromatic content (%) |  | 23.2 | 10.0 | 10.9 | 7.4 | 4.5 |
| Aromatic structure | Mono | 20.1 | 9.8 | 10.7 | 7.2 | 4.3 |
|  | Di | 2.8 | 0.2 | 0.2 | 0.2 | 0.2 |
|  | Tri | 0.3 | Not detected | Not detected | Not detected | Not detected |
| Distillation test (° C.) | Initial boiling point (IBP) | 227 | 197 | 203 | 191 | 173 |
|  | 5% boiling point | 246 | 235 | 237 | 231 | 218 |
|  | 10% boiling point | 254 | 248 | 250 | 245 | 233 |
|  | 30% boiling point | 272 | 268 | 269 | 266 | 259 |
|  | 50% boiling point | 289 | 284 | 285 | 282 | 277 |
|  | 70% boiling point | 307 | 303 | 303 | 301 | 295 |
|  | 90% boiling point | 337 | 334 | 334 | 332 | 325 |
|  | 95% boiling point | 349 | 348 | 347 | 345 | 337 |
|  | End point (EP) | 365 | 365 | 364 | 362 | 352 |

Hydroisomerization was conducted using the catalyst for hydroisomerization of normal paraffins at different reaction temperatures as seen from Table 3. The products were analyzed by offline gas chromatography. The analysis condition was the same as in Test Example 2. The conversion rate of the diesel feed sample was calculated as the fraction of normal paraffins with carbon chain lengths of 12-22 after the reaction. The liquid yield was calculated as the ratio of the mass of actually collected liquid to the theoretical value. When the hydroisomerization was conducted for the diesel feed sample with a cloud point of −1° C. and a pour point of −8° C. at a hydrogen pressure of 20 atm, a space velocity of 2 h⁻¹, a hydrogen gas pressure of 20 mol/mol and a reaction temperature 267-287° C. using the prepared catalyst for hydroisomerization of normal paraffins, significantly improved products with a cloud point of −22 to −52° C. and a pour point of −26 to −55° C. could be obtained. The catalyst for hydroisomerization of normal paraffins showed inhibited nonselective hydrocracking and improved isomer yield due to the decreased external acid sites in the multi-level pore zeolite used as the support and due to the mesopores present in the multi-level pore zeolite. As a result, the products could be obtained with a high yield of 94.5-99.3%.

Also, it was confirmed that the cloud point, pour point, sulfur content, total aromatic content, etc. decreased as the conversion rate increased. In addition, it was confirmed that as the conversion rate increased the initial boiling point (IBP) decreased and most of the produced aromatics had monoaromatic structures.

The conversion rate means the ratio of the normal paraffins that were converted to isoparaffins or other materials. And, the boiling point expressed with the percentage value, e.g., 5% boiling point, means the temperature at which 5% of the liquid fuel is vaporized.

Figure 9:
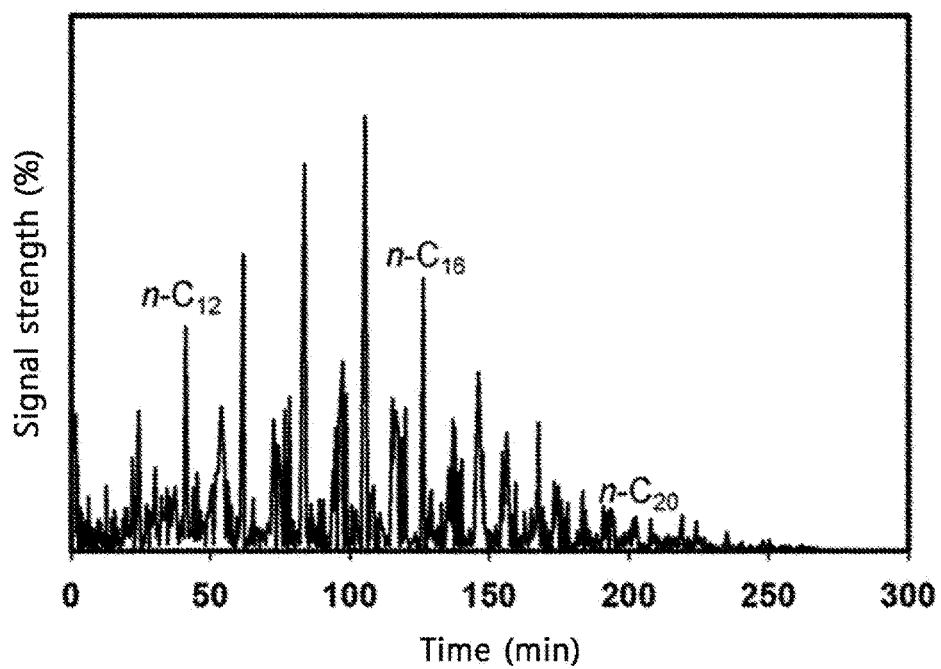
FIG. 9 shows a result of conducting hydroisomerization of a liquid material corresponding to diesel using a catalyst for hydroisomerization of normal paraffins synthesized using a multi-level pore zeolite prepared according to an exemplary embodiment of the present disclosure as a support and analyzing the obtained liquid product by gas chromatography.

Also, as seen from FIG. 9, it was confirmed that the proportion of isoparaffins to normal paraffins was higher for the hydrocarbons with carbon chain length of 12 or larger.

In addition, hydroisomerization of a diesel feed sample was conducted using the catalyst for hydroisomerization of normal paraffins prepared from the zeolite of Example 2 at different reaction temperatures. The result is shown in [Table 4].

TABLE 4

|  |  | Diesel feed sample | Reaction temperature | | | |
|---|---|---|---|---|---|---|
|  |  |  | 246° C. | 257° C. | 267° C. | 277° C. |
| Conversion rate (%) |  | — | 11.4 | 24.9 | 36.2 | 53.1 |
| Liquid yield (%) |  | — | 99.8 | 99.6 | 99.8 | 99.6 |
| Cloud point (° C.) |  | −1 | −3 | −8 | −16 | −27 |
| Pour point (° C.) |  | −8 | −10 | −14 | −21 | −31 |
| Sulfur content (ppm) |  | 8 | 1 or less | 1 or less | 1 or less | 1 or less |
| Total aromatic content (%) |  | 23.2 | 8.4 | 7.6 | 6.5 | 6.2 |
| Aromatic structure | Mono | 20.1 | 8.4 | 7.6 | 6.5 | 6.2 |
|  | Di | 2.8 | Not detected | Not detected | Not detected | Not detected |

TABLE 4-continued

| | | Diesel feed sample | Reaction temperature | | | |
|---|---|---|---|---|---|---|
| | | | 246° C. | 257° C. | 267° C. | 277° C. |
| | Tri | 0.3 | Not detected | Not detected | Not detected | Not detected |
| Distillation test (° C.) | Initial boiling point (IBP) | 227 | 202 | 201 | 201 | 194 |
| | 5% boiling point | 246 | 234 | 233 | 233 | 229 |
| | 10% boiling point | 254 | 245 | 244 | 244 | 242 |
| | 30% boiling point | 272 | 265 | 265 | 265 | 263 |
| | 50% boiling point | 289 | 284 | 283 | 283 | 281 |
| | 70% boiling point | 307 | 303 | 302 | 301 | 299 |
| | 90% boiling point | 337 | 334 | 333 | 333 | 331 |
| | 95% boiling point | 349 | 348 | 347 | 347 | 345 |
| | End point (EP) | 365 | 362 | 362 | 362 | 360 |

As seen from Table 4, when the hydroisomerization was conducted for the feed with a cloud point of −1° C. and a pour point of −8° C. at a hydrogen pressure of 20 atm, a space velocity of 2 h$^{-1}$, a hydrogen gas pressure of 20 mol/mol and a reaction temperature 246-277° C. using the prepared catalyst for hydroisomerization of normal paraffins, significantly improved products with a cloud point of −3 to −27° C. and a pour point of −10 to −31° C. could be obtained, as when the catalyst for hydroisomerization of normal paraffins prepared using the zeolite of Example 3 was used. The catalyst for hydroisomerization of normal paraffins showed inhibited nonselective hydrocracking and improved isomer yield due to the decreased external acid sites in the multi-level pore zeolite used as the support and due to the mesopores present in the multi-level pore zeolite. As a result, the products could be obtained with a high yield of 99.6-99.8%.

Also, it was confirmed that the cloud point, pour point, sulfur content, total aromatic content, etc. decreased as the conversion rate increased. In addition, it was confirmed that as the conversion rate increased the initial boiling point (IBP) decreased and most of the produced aromatics had monoaromatic structures. In particular, it was confirmed that the liquid yield was maintained at 99.6% or higher although the conversion rate was 53.1% and the cloud point and the pour point were decreased to −27° C. and −31° C., respectively.

INDUSTRIAL APPLICABILITY

A catalyst which is prepared by supporting a metal on a multi-level pore zeolite of the present disclosure can effectively improve cloud point and pour point when used as a catalyst for hydroisomerization of normal paraffins and thus can be used as a catalyst for hydroisomerization of normal paraffins such as diesel or lube base oil.

The invention claimed is:
1. A method for preparing a multi-level pore zeolite containing silicon, aluminum, and phosphorus, comprising:
(A) mixing a silicon precursor, an aluminum precursor, a phosphorus precursor, a structure directing agent and water;
(B) adding phenylphosphonic acid, carbon black or a mixture thereof to the mixture prepared in (A) and mixing the same;
(C) crystallizing the mixture prepared in (B) by heat-treating the same; and
(D) calcining the crystallization product,
wherein the multi-level pore zeolite has 10-30 vol % of micropores having a diameter of 0.1-1.9 nm based on the volume of total pores, 50-70 vol % of mesopores having a diameter of 2.0-50.0 nm based on the volume of total pores and 5-20 vol % of macropores having a diameter of 50.1-60.0 nm based on the volume of total pores.

2. The method for preparing a multi-level pore zeolite according to claim 1, wherein, in (A), the silicon precursor is one or more selected from a group consisting of silica sol, fumed silica, tetraethyl orthosilicate and tetrapropyl orthosilicate; the aluminum precursor is aluminum isopropoxide, pseudoboehmite or a mixture thereof; the phosphorus precursor is phosphoric acid, phosphorous acid or a mixture thereof; and the structure directing agent is one or more selected from a group consisting of dipropylamine, triethylamine, tripropylamine, dibutylamine and heptylamine.

3. The method for preparing a multi-level pore zeolite according to claim 1, wherein, in (B), when the phenylphosphonic acid is added alone, a molar ratio of the water/phenylphosphonic acid is 45.5-1,000.

4. The method for preparing a multi-level pore zeolite according to claim 1, wherein, in (B), when the phenylphosphonic acid is added alone, a molar ratio of the structure directing agent/phenylphosphonic acid is 0.9-38.0.

5. The method for preparing a multi-level pore zeolite according to claim 1, wherein, in (B), when the phenylphosphonic acid is added alone, a molar ratio of the phosphorus precursor/phenylphosphonic acid is 1.8-40.0.

6. The method for preparing a multi-level pore zeolite according to claim 1, wherein, in (B), when the phenylphosphonic acid is added alone, a molar ratio of total phosphorus ($P_2O_5$) contained in the phosphorus precursor and phenylphosphonic acid/aluminum ($Al_2O_3$) is 1.0-1.6.

7. The method for preparing a multi-level pore zeolite according to claim 1, wherein, in (B), when the carbon black is added alone, it is added in an amount of 1-250 parts by weight based on 100 parts by weight of the multi-level pore zeolite and a weight ratio of the structure directing agent/carbon black is 0.5-50.

8. The method for preparing a multi-level pore zeolite according to claim 1, wherein, in (B), when a mixture of the phenylphosphonic acid and the carbon black is added, a molar ratio of the water/phenylphosphonic acid is 45.5-1,000.

9. The method for preparing a multi-level pore zeolite according to claim 1, wherein in (B), when a mixture of the phenylphosphonic acid and the carbon black is added, a molar ratio of the structure directing agent/phenylphosphonic acid is 0.9-46.0.

10. The method for preparing a multi-level pore zeolite according to claim 1, wherein in (B), when a mixture of the phenylphosphonic acid and the carbon black is added, a molar ratio of the phosphorus precursor/phenylphosphonic acid is 1.8-40.0.

11. The method for preparing a multi-level pore zeolite according to claim 1, wherein in (B), when a mixture of the phenylphosphonic acid and the carbon black is added, a molar ratio of total phosphorus ($P_2O_5$) contained in the phosphorus precursor and phenylphosphonic acid/aluminum ($Al_2O_3$) is 1.0-1.6.

12. The method for preparing a multi-level pore zeolite according to claim 1, wherein, in (B), when a mixture of the phenylphosphonic acid and the carbon black is added, the carbon black is added in an amount of 1-250 parts by weight based on 100 parts by weight of the multi-level pore zeolite.

13. The method for preparing a multi-level pore zeolite according to claim 1, wherein, in (A), a molar ratio of aluminum ($Al_2O_3$)/silicon ($SiO_2$) is 2-20.

14. The method for preparing a multi-level pore zeolite according to claim 1, wherein the zeolite has an accessibility factor value of (the amount of external Brønsted acid sites/the amount of total Brønsted acid sites×100)/outer surface area is 0.4 or smaller.

15. The method for preparing a multi-level pore zeolite according to claim 1, wherein the multi-level pore zeolite containing silicon, aluminum, and phosphorus is SAPO-11.

\* \* \* \* \*